United States Patent [19]

Silver

[11] Patent Number: 5,546,587
[45] Date of Patent: Aug. 13, 1996

[54] DECENTRALIZED BUS ARBITRATION SYSTEM WHICH CONTINUES TO ASSERT BUS REQUEST SIGNAL TO PRECLUDE OTHER FROM ASSERTING BUS REQUEST SIGNAL UNTIL INFORMATION TRANSFER ON THE BUS HAS BEEN COMPLETED

[75] Inventor: Jordan R. Silver, San Jose, Calif.

[73] Assignee: Tandem Computers Incorporated, Cupertino, Calif.

[21] Appl. No.: 332,617

[22] Filed: Oct. 31, 1994

Related U.S. Application Data

[63] Continuation of Ser. No. 707,714, May 30, 1991, abandoned.

[51] Int. Cl.⁶ .................................................. G06F 13/18
[52] U.S. Cl. ................... 395/730; 395/299; 364/240.4; 364/241.2; 364/241.6; 364/242.6; 364/242.7; 364/242.92; 364/DIG. 1
[58] Field of Search ........................... 395/800, 200, 395/325, 725, 729, 299, 478, 730; 340/825.5, 825.25

[56] References Cited

U.S. PATENT DOCUMENTS

| | | | |
|---|---|---|---|
| 3,815,099 | 6/1974 | Cohen et al. | 340/172.5 |
| 4,229,791 | 10/1980 | Levy et al. | 364/200 |
| 4,232,366 | 11/1980 | Levy et al. | 364/200 |
| 4,320,467 | 3/1982 | Glass | 395/725 |
| 4,384,322 | 5/1983 | Bruce et al. | 395/325 |
| 4,384,323 | 5/1983 | Ahuja | 395/729 |
| 4,451,881 | 5/1984 | Grice et al. | 395/200 |
| 4,451,886 | 5/1984 | Guest et al. | 395/325 |
| 4,473,880 | 9/1984 | Budde et al. | 395/725 |
| 4,488,218 | 12/1984 | Grimes | 395/325 |
| 4,514,728 | 4/1985 | Ahuja | 340/825.5 |
| 4,620,278 | 10/1986 | Ellsworth et al. | 395/299 |
| 4,628,447 | 12/1986 | Cartret et al. | 364/200 |
| 4,638,313 | 1/1987 | Sherwood, Jr. et al. | 340/825.52 |
| 4,716,410 | 12/1987 | Nozaki | 340/825.52 |
| 4,745,548 | 5/1988 | Blahut | 364/200 |
| 4,785,394 | 11/1988 | Fischer | 395/325 |
| 4,787,029 | 11/1988 | Kahn | 364/200 |
| 4,835,672 | 5/1989 | Zenk | 395/478 |
| 4,853,846 | 8/1989 | Johnson et al. | 395/325 |
| 4,864,496 | 9/1989 | Triolo et al. | 395/325 |
| 4,910,655 | 3/1990 | Ashkin et al. | 364/200 |
| 4,920,486 | 4/1990 | Nielsen | 395/325 |
| 4,954,821 | 9/1990 | Gray et al. | 340/825.52 |
| 4,979,097 | 12/1990 | Triolo et al. | 395/325 |
| 4,979,099 | 12/1990 | Milia et al. | 395/325 |
| 4,984,195 | 1/1991 | Nakamura et al. | 395/325 |
| 5,006,981 | 4/1991 | Beltz et al. | 395/325 |
| 5,053,947 | 10/1991 | Heibel et al. | 395/325 |
| 5,088,024 | 2/1992 | Vernon et al. | 395/725 |
| 5,123,092 | 6/1992 | Buxton et al. | 395/250 |
| 5,138,703 | 8/1992 | Igarashi | 395/325 |
| 5,151,994 | 9/1992 | Wille et al. | 395/800 |
| 5,167,022 | 11/1992 | Bahr et al. | 395/325 |
| 5,168,570 | 12/1992 | Eckert et al. | 395/729 |
| 5,265,223 | 11/1993 | Brockmann et al. | 395/325 |

FOREIGN PATENT DOCUMENTS 3928481  8/1989  Germany .

OTHER PUBLICATIONS

F. T. Birch et al, I.B.M. Technical Disclosure Bulletin vol 16. No. 3, Aug. 1973 "Priority Determination and Servicing of I/O Devices".

*Primary Examiner*—Meng-Ai An
*Attorney, Agent, or Firm*—Townsend and Townsend and Crew LLP

[57] ABSTRACT

A processor system comprising a number of data handling units interconnected by a system bus operates according to a novel protocol wherein one of the number of data handling units issues a buss request signal together with a separate arbitration signal uniquely identifying the data handling unit requesting access to the system bus. Distributed priority determination logic, located in each data handling unit, allows each data handling unit requesting bus access at the same moment in time to independently and unilaterally ascertain who has access. The bus request signal remains asserted to hold off any additional requests for bus access until all data handling units first requesting access have been serviced.

11 Claims, 5 Drawing Sheets

DECENTRALIZED BUS ARBITRATION SYSTEM WHICH CONTINUES TO ASSERT BUS REQUEST SIGNAL TO PRECLUDE OTHER FROM ASSERTING BUS REQUEST SIGNAL UNTIL INFORMATION TRANSFER ON THE BUS HAS BEEN COMPLETED

This is a Continuation of application Ser. No. 07/707,714, filed May 30, 1991, now abandoned.

BACKGROUND OF THE INVENTION

The present invention is directed generally to data processing apparatus, and particularly to a novel protocol that permits distributed arbitration for access to a processor system synchronous bus, and efficient information transfer on the system bus.

In a data processing system, information is most likely to be transferred among the various elements (e.g., memory, input-out channels, and the like) of the system by a processor bus, that may be either synchronous or asynchronous, according to predetermined protocols. For high speed information transfers it is often preferred that a synchronous bus be used in which a periodic clock signal is used to define the incremental time periods within which units of information are passed on the system bus from a sender to a receiver unit. While there are a variety of synchronous bus protocols in use, most if not all have certain undesirable features. For example, one such bus protocol relies upon a master control unit that maintains a central arbitration scheme for bus access. Such protocols tend to be wasteful in time, expensive in circuit elements and their count, and complex in design. Other protocols for information transfers on a synchronous bus permit transfers only in bursts of specified length. Thus, large quantities of information must be broken into smaller portions and transmitted at the expense of time and circuit complexity.

Often, too, it is a fact that default devices are not given fair (e.g., equal) access to the bus for information transfers; the default device must accede to other devices before it can gain access. Alternatively, the default device can be included in a prioritization scheme at the cost, again, of circuitry and system complexity.

Yet another feature believed undesirable is that high speed transfers often do not "handshake" the individual units of a large transfer; that is, the entire transfer is made before any signalling is asserted to indicate whether or not an error in transmission has occurred.

SUMMARY OF THE INVENTION

The present invention provides a novel protocol for arbitrated access to a processor bus in which arbitration is distributed among the data handling units requesting access. The protocol also permits control of the information transfer on the bus to be handled by both the requesting and responding units.

According to the present invention, a number of data handling units (e.g., processor units, input/output channels, memory systems, and the like) are interconnected by a processor system bus for transferring information thereon. Certain of the data handling units are configured to operate as "requester" units in that they have the capability of requesting access to the processor bus information transfers. Others of the data handling units are configured as "responder" units in that they will respond to the requests made by the requester data handling units. Still others may be both a requester and a responder.

According to the present invention, access is requested when a Requester data handling unit asserts a bus request signal, together with an arbitration signal that is unique to the requesting unit. All data handling units having requester status receive the signal lines carrying the unique arbitration signals, each arbitrating amongst themselves on a priority basis as to who has access—when more than one requester unit seeks bus access. The highest priority data handling unit will, itself, recognize that it is the highest priority unit and grab access to the bus; the other requesting units withhold their requests.

According to the protocol, the requester data handling unit, after obtaining access to the bus, first transmits a command signal on command lines that are received by data handling units that respond to information transfers ("responder units"), together with an address on address/data lines of the processor system bus identifying a particular responder unit and a "start" address related to the information to be transferred. A colloquy is thereby set up between the requester and responder units during which one or more portions of information is transferred. At the end of the second to last portion of information transferred, the requester unit will de-assert the bus request signal and its unique arbitration signal, thereby signalling other devices that they may now arbitrate for access to the processor system bus.

Other aspects of the protocol include the fact that it is designed to permit a default data handling unit to request and obtain fair, equal access without arbitration. Further, the protocol provides a technique for unlimited amounts of information to be transferred, avoiding having to transfer in bursts.

A number of advantages are obtained by the present invention. There is provided requester units, as well as a default unit, fair (e.g., equal) access to the bus without idle cycles, unlike prior arbitration techniques which require default devices to incur idle cycles between rounds of arbitration in order to gain access. In particular, the default unit, which in the context of the preferred embodiment of the invention is processor unit, is ensured fair access to the system bus. By "fair access" is meant that, if the system bus is presently assumed by other units of the system needed by the default unit, it (the default unit) is assured access before any other unit is given access twice.

Further, where prior art synchronous protocols restrict length of the transfer over very high speed devices, without positive acknowledgement of each portion of information transferred, the present protocol permits the requester data handling units to send or receive the entire, requested information transfer, at a rate consistent with the responding data unit handlers requirements.

These and other aspects and advantages of the present invention will become apparent to those skilled in the art upon the reading of the following detailed description of the invention which should be taken in conjunction with the accompanying drawings.

DETAILED DESCRIPTION OF THE INVENTION

Figure 1:
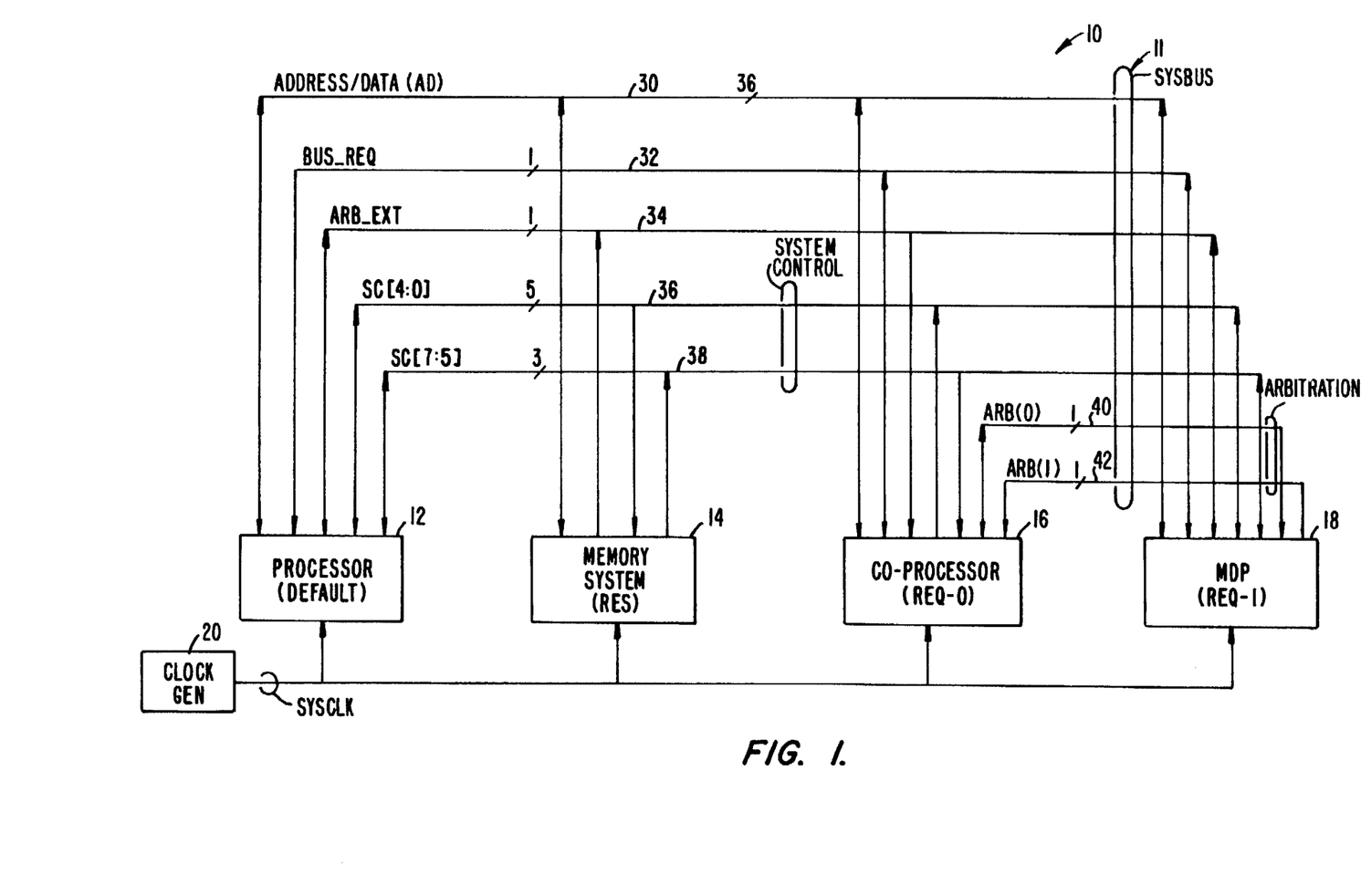
FIG. 1 is a schematic representation of the data handling units of a processor system interconnected by a processor system bus.

Turning now to the figures, and for the moment specifically FIG. 1, there is illustrated a processor system, designated generally with the reference numeral 10. The processor system 10 is constructed to implement the protocol of the present invention and is shown as including a number of data handling units: a processor unit 12, a memory system 14, a co-processor 16, and a maintenance diagnostics processor (MDP) 18, interconnected by a processor system bus (SYSBUS) 11.

The data handling units 12–18 may be one of three types. They may be a "Requester" data handling unit in the sense that requests for information transfers on the SYSBUS are initiated by such Requestor data handling unit. The processor unit 12, the co-processor 16, and the MDP 18 are examples of this type. Other of the data handling units may be a "Responder" data handling unit type in the sense that they are structured solely to respond to requests for information transfers. Thus, the memory system 14 is an example of this type. Finally, the third type of data handling unit is as both Responder and Requester, capable of both responding to requests for information transfers on SYSBUS 11 as well as requesting information transfers. An example of this latter type is the MDP 18.

The MDP 18 is designed to perform various maintenance diagnostic functions and to both request information transfers and respond to requests for information transfers.

The processor unit 12 operates, in the context of the protocol used, as a default device, the significance of which will become evident below.

It should be appreciated that while, for the most part, FIG. 1 is a realistic representation of a processor system, certain "poetic license" has been taken for the purpose of better illustrating and describing the invention—while still including the essential details and best mode representation. For example, the co-processor 16 most likely will function, like MDP 18, as both a Requester data handling unit and a Responder data handling unit (responding, for example, to requests from the processor unit 12 to transfer the results of a computation or the like).

The processor system 10 of FIG. 1 also includes a clock generator 20 which produces a system clock (SYSCLK) signal in the form of a periodic clock signal (see waveform 82, FIG. 3) to the data handling units 12–18. The SYSCLK signal is used, among other things not relevant here, to define successive information transfer intervals on the SYSBUS 11—hereinafter referred to as "bus cycles". Each such bus cycle is a period T (FIG. 3) of the SYSCLK during which information (command or data) can be transferred from one data handling unit to another.

The clock generator 20 may be of conventional design, providing the SYSCLK signal on a single signal line 22 to the data handling units 12–18; or it may be of a design that provides a plurality of synchronized clock signals, one for each of the data handling units 12–18 in which case the signal line 22 represents multiple signal lines, one for each data handling unit. The latter is preferred, and the self-calibrating clock synchronization system of U.S. application Ser. No. 471,915, now U.S. Pat. No. 5,036,528, assigned to the assignee of this invention, is an example of such a clock generator.

The SYSBUS 11, interconnecting the data handling units 12–18, comprises 48 individual signal lines, thirty-six of which form address/data (AD) signal lines 30 used to transfer address and data (with associated parity) information. Thirty-two of the AD signal lines 30 carry four bytes (32 bits), in parallel, of address or data, while four lines of the AD signal carry parity—one parity bit for each byte of address/data.

Certain of the signal lines of SYSBUS 11 carry signals that operate under the protocol of the present invention to allow a Requester data handling unit (e.g., co-processor 16) to request and gain access to the SYSBUS 11 for transferring information. Thus, the SYSBUS 11 includes a single signal line 32 that carries a bus request (BUS_REQ) signal. The signal line 32 is shared among the data handling devices, and functions to carry the signal BUS_REQ that operates, with other signalling, to request access to the SYSBUS 11 for information transfer 12–18. Signal line 34 of the SYSBUS 11 carries an arbitration extend (ARB_EXT) signal, and is shared by the default device, processor unit 12, and the data handling units capable of operating as a Responder, the memory system 12 and the MDP 18 (which, as indicated, can also operate as a Requester). The ARB_EXT signal operates as the request for access to the SYSBUS 11 for the default unit, the processor unit 12, and therefore needs to be communicated to all other Requester units in the system 10, or any added, to permit arbitration. Further, the signal line 34 carrying the ARB_EXT signal will need to be coupled to those Responder units having the need, and capability, of extending a data transfer colloquy on the SYSBUS 11, as will be described below. In short, Requester units, except for the default unit, processor unit 12, have no need to drive the signal line 34, but do need to receive it for determining whether access to the SYSBUS 11 can be taken.

Two sets of multiple control lines 36, 38 carry system control (SC) signals. The five control lines 36 carry control signals (SC[4:0]) that are used principally by Requester data handling units to carry command information concerning information transfers. The three control lines 38 carry "handshake" signals (SC[7:5]) from the Responder data handling units (e.g., memory system 14) during information transfers on the SYSBUS 11 to signal and control progress of the information transfer. Finally, two individual arbitration lines 40 and 42 carry arbitration signals (ARB0) and ARB(1)) between co-processor 16 and the MDP 18. It will be noted that if more Requesters are added, there may be more arbitration lines.

A comment about the notation used FIG. 1: The arrow heads drawn on the signal lines are used to specifically indicate those data handling units that drive and/or receive signals on the various signal lines of the SYSBUS 11. Thus, for example, the AD signal lines 30 are both driven (i.e., signals placed upon) and are received by all data handling units 12–18. The arrow heads are used to represent information flow from, for example, the memory system 14 to the AD signal lines 30, and from the AD signal lines 30 to the memory system 14. Conversely, the bus request line 32 is driven and received only by certain of the data handling units 12–18, specifically those that request access to the SYSBUS for information transfers (e.g., the processor 12, the co-processor 16, or the MDP 18).

The control lines 36, 38 communicate 8 bits of control information between a Requester data handling unit (e.g., co-processor 16 or processor 12) and a Responder data handling unit (e.g., memory system 14). The 5 bits of control information carried by the signal lines 36 are provided by the Requester data handling units, and function to identify the type of request (e.g., read data or write data, etc.). The 3 bits of control information carried by the signal lines 38 are presented by the Responder data handling units, and function principally to signal progress of information transfers. The specific meanings of the control signals (SC[7:0]) carried by the control signal lines 36, 38 are set forth below in Table 1.

TABLE 1

| Signal Line | Command Phase | Data Phase |
|---|---|---|
| sc[0] | Command Phase Valid=1 | Command Phase Valid=0 |
| sc[1] | Transfer Operation[0] | EOT |
| sc[2] | Transfer Operation[1] | Parity (for SC[4:0]) |
| sc[3] | Byte_Length[0] | na |
| sc[4] | Byte_Length[1] | na |
| sc[5] | na | Responder Handshake |
| sc[6] | na | Responder Handshake |
| sc[7] | na | Responder Handshake |

Information transfers on the SYSBUS are conducted in two sequential phases, a command phase and a data phase. The command phase serves to identify the type of information transfer to be conducted, and the data phase includes the transfer of the requested information. Thus, a Requester data handling unit will identify the command phase by asserting the SC[0] signal, together with the system control signals SC[1] and SC[2], to define the type of transfer operation desired. Table 2, below, sets forth the interpretation definition of these two system control signals.

TABLE 2

| SC[2:1] | OPERATION |
|---|---|
| 00 | read |
| 01 | write |
| 10 | block read |
| 11 | block write |

Simple read and write operations (as opposed to block read or write operations) result in the transfer (on the AD signal lines 30) of up to four bytes of data, and may be conducted in as few as two bus cycles: a bus cycle of command phase and one or more bus cycles of data phase. The control signals SC[3] and SC[4] (Table 3, below) define the number of bytes of data transferred during such simple reads and writes.

TABLE 3

| SC[4:3] | BYTE LENGTH |
|---|---|
| 00 | 1 |
| 01 | 2 |
| 10 | 3 |
| 11 | 4 |

The block read and write operations are of indeterminate length, and are determined by the Requester data handling units. The Responder data handling units, during block transfers, merely continue to send (or receive) data during the data phase until an end of transmission (EOT) signal is detected. The EOT signal occurs when, during the data phase, the control signal SC[1] is asserted by the Requester data handling unit that initiated the transfer. During the command phase, the control signals SC[7:5] are not applicable ("na"), and therefore can be of any state.

The control signal SC[2], during the data phase, is parity for the control signals SC[4:0] during the immediately preceding bus cycle. Control signals for the very last bus cycle are not covered.

During the data phase, however, the control signals SC[7:5], carried by the signal lines 38, are provided by the Responder data handling unit (e.g., memory system 14), coded to signal to the Requester data handling unit the status of each piece of information transferred during each bus cycle. The definitions of the Responder handshake codes are identified in Table 4, below.

TABLE 4

| SC[7:5] | HANDSHAKE |
|---|---|
| 000 | WAIT |
| 001 | Data Predict ("PREDICT") |
| 01X | Uncorrectable Data Error (UCME); Soft Abort |
| 10X | Normal ("NORM") |
| 11X | Correctable Data Error |

The three signal lines 30 are capable of carrying up to and including eight different handshake codes. However, only five are presently used, leaving room for further expansion.

If, during a data phase, the Responder data handling unit determines that the transfer during any particular bus cycle will be successful, it will assert the NORM handshake on the signal lines 38. Thereby, the Requester data handling unit is informed that insofar as the other end of the transfer is concerned the information transfer of that bus cycle is complete. This is not to say that the Requester agrees. If, for some reason, the Requester determines that the transfer was not successful, even though signalled by the Responder with the NORM handshake, it (the Requester) can abort the transfer and initiate the same request again—or take whatever else action deemed necessary and/or appropriate under the circumstances.

Conversely, if the Responder feels that the transfer will not be successful it will assert the WAIT handshake signal, informing the Requester that the information transfer of the bus cycle did not occur, or was otherwise faulty, resulting in information to be again placed on the AD signal lines 30 the next bus cycle.

During the read or block read operations, "data predict" system handshake signals may be used by the Responder to indicate that data is coming the next bus cycle, giving the Requester (e.g., processor 12) time to set up to receive the data.

The memory system 14 preferably is of a type configured to correct at least single bit errors, and detect double bit errors, when retrieving stored data. Thus, data words will be stored with some form of associated error correcting code (e.g., Hamming code) to detect and correct 1-bit errors that may be contained in the retrieved (in response to a request therefor) data word. Even though corrected, however, when transferred, the correction will be brought to the attention of the Requester by the "Correctable Data Error" handshake, signalling that although the data most likely is correct, correction was required. Alternatively, if the retrieved data word is determined to be uncorrectable, the "Uncorrectable Data Error" handshake will be asserted with the (contaminated) data word, leaving it to the Requester as to how to handle the matter.

The function of the system control signals SC[7:0] will become clearer when the various information transfers are discussed with reference to FIGS. 3–7.

Figure 2:
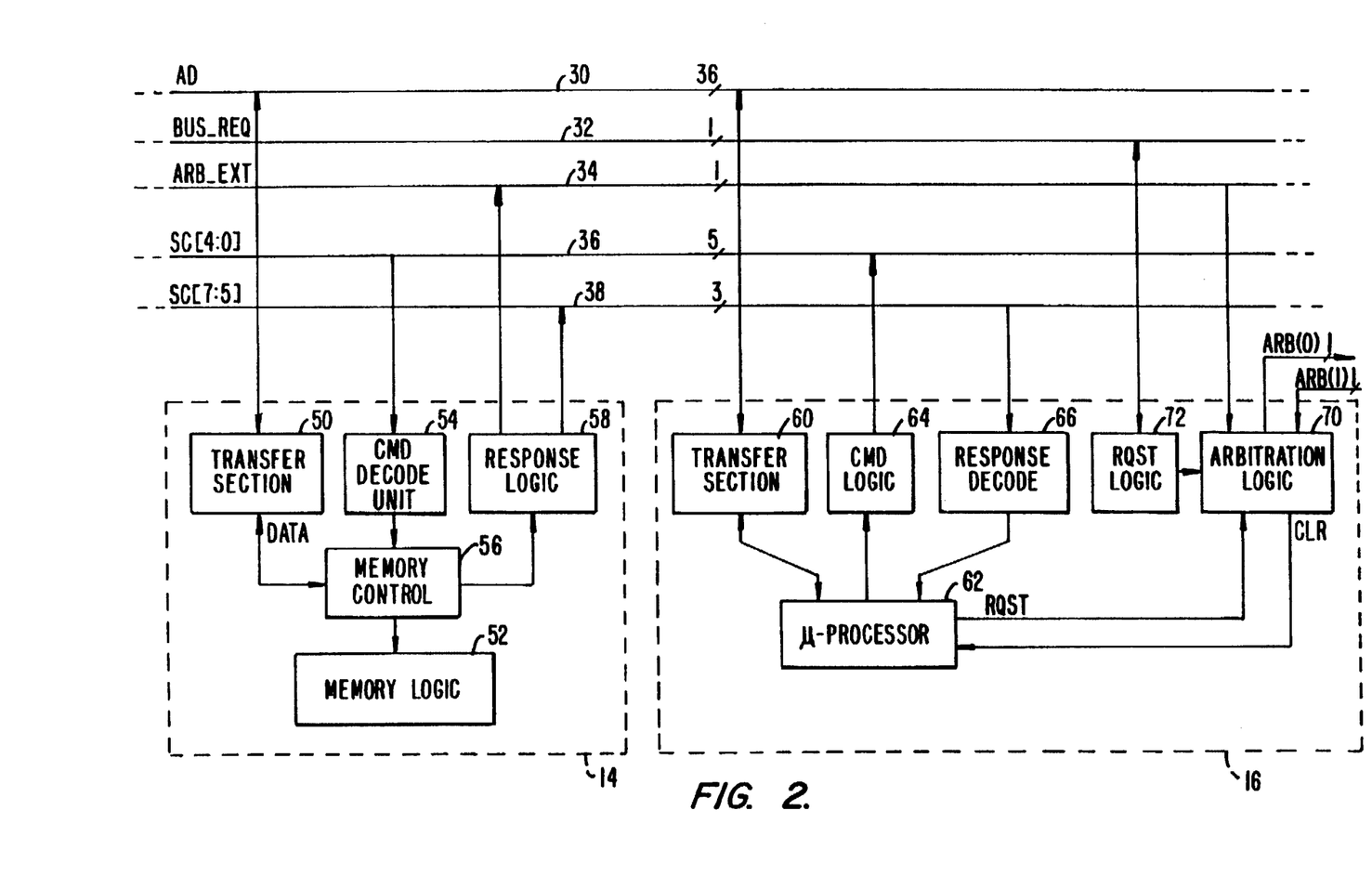
FIG. 2 is a general block diagram illustration of the components of a requester data handling unit and a responder data handling unit for implementing the protocol of the present invention.

Turning now, for the moment, to FIG. 2, there is broadly illustrated, in block diagram and representative form, the logical elements utilized by the memory system 14 and co-processor 16 to function as Responder and Requester data handling units under the protocol of the present invention.

Turning first to the logical representation of memory system 14, it is shown as including a transfer section 50 operable to communicate information from the AD lines 30 to the memory logic 52 (and associated error correction codes—provided by the memory logic 52), or from the memory logic 52 to the AD lines 30, depending upon the requested operation to which the memory system 14 is responding. As indicated above, the operation is defined by the five control signal lines 36 which are received by a command decode unit 54 where they are decoded, and the decode supplied to a memory control 56. The memory control 56 operates to retrieve or store information in the logic unit 52, depending upon the command.

Each bus cycle of information transfer is signalled by the system control handshake signals carried on the system control signal lines 38, which are driven by the response logic 58 of the memory control system 14. Thus, for example, if information is successfully communicated on the AD signal lines 30 for storage by the memory system 14, the memory control 56 will command the response logic 58 to assert, on the signal control lines 38, the NORM handshake. Conversely, if during a read operation in which information is to be communicated on the AD lines 30 from the memory system 14, and the data accessed from the memory logic 52 by the memory control 56 requires correction, the memory control will affect that correction, communicate the corrected data to the transfer section 50 which, in turn, drives the AD lines 30 with the corrected information. At the same time, the memory control 56 will command the response logic 58 to drive the system control signal lines 30 with a Correctable Data Error handshake; or, if the data is uncorrectable, the system control signal lines 38 will be driven with an Uncorrectable Data Error handshake.

The co-processor 16, capable of forming the other end of a data transfer, also includes a transfer section 60 coupled to the AD lines 30 for receiving information communicated thereon. The transfer section 60 then operates to transfer the received information to a microprocessor 62, forming the intelligence of the co-processor 16. Command logic 64 responds to the microprocessor 62 to drive the system control signal lines 36 with the desired command as formulated by the microprocessor 62. Response logic 64 of the co-processor 16 receives the control signal lines 38 and communicates the handshake information appearing thereon to the microprocessor 62.

An important aspect of the protocol of the present invention resides in the method used to grant a Requester data handling unit access to the SYSBUS for information transfers. This method operates under the following basic rules:

1. First, access to the SYSBUS is initiated by a Requester data handling unit when the BUS_REQ signal is asserted on signal line 32, together with the Requester's unique arbitration signal (e.g., ARB0) in the case of the co-processor 16, or ARB(1) in the case of MDP 18). The default device (i.e., processor unit 12, FIG. 1) utilizes the ARB_EXT signal to initiate SYSBUS access.

2. Second, a request for access cannot be made while the BUS_REQ signal is asserted. The BUS_REQ signal is deasserted at the end of the second to last cycle of information transfer, thereby allowing other Requesters access to the SYSBUS 11. Arbitration is conducted during the last information transfer cycle of a previous colloquy.

Returning to FIG. 2, the arbitration logic 70 of the co-processor 16 is implemented in combinatorial logic that receives the arbitration signals of other Requester data handling units (e.g., the MDP 18), and the ARB_EXT signal line, and determines therefrom whether it has access, or must accede access to another, higher priority, Requester (e.g., co-processor 16). In this manner, each individual Requester data handling unit determines whether, when multiple Requesters are attempting to gain access to the SYSBUS, it has access, or must accede to another.

As FIG. 2 indicates, the arbitration logic 70 of the co-processor 16 also receives the ARB_EXT signal line, which is used by Responder units (as will be discussed more fully below) to extend an information transfer colloquy, and by the default device, processor unit 12, to request access. The arbitration logic 70 also receives, from the request logic 72, an indication of whether or not the BUS_REQ signal is asserted, to determine whether it can assert the ARB(0) arbitration signal and the BUS_REQ signal of the co-processor 16 to request access. As indicated above, according to the protocol rules for requesting access, the processor 16, through arbitration logic 70, can assert its associated arbitration signal, ARB(0), only when BUS_REQ is not asserted. As will be seen, the arbitration aspect of the protocol of the present invention will not allow a requester data handling unit access to the bus until all others requesting access have had their turn.

In the processor system 10, configured as illustrated in FIG. 1, there would be no need for the co-processor 16 to have the signal line 40 for the ARB(0) signal. Assuming that the priority of arbitration assigns all other Requesters (e.g., the processor unit 12 and the MDP 18) higher priority, the co-processor 16 would be configured to know that it can get access to the SYSBUS 11 after all other requests are honored, but before any second request is granted. However, to better illustrate the arbitration concept, the co-processor 16 is shown here as having an arbitration line 40 for its associated ARB(0) signal.

With an understanding of the architecture of the system 10, as described above, the use of that architecture to implement the protocol of the present invention can now be described with reference to the time diagrams of FIGS. 3–7.

Before discussing the time diagrams of FIGS. 3–7, however, mention needs to be made of a preferred design point: All activity relating to use of the SYSBUS 11 is keyed primarily to the rising edges (LOW to HIGH transitions) of the SYSCLK signal 82 (FIGS. 3–7). Thus, as FIGS. 3–7 illustrate, the protocol signals (e.g., BUS_REQ, ARB_EXT, SC[7:0]) are asserted with the rising edge of SYSCLK; information (commands and data) on the AD signal lines 30 is considered valid, and accepted on the rising edge of SYSCLK. With this in mind the timing diagrams of FIGS. 3–7 can be discussed to illustrate and explain the protocol used for information transfers on SYSBUS 11. Further, when a signal is stated as being "asserted" it is intended to mean that the signal line carrying the signal experiences a LOW to HIGH voltage transition—unless otherwise noted.

Figure 3:
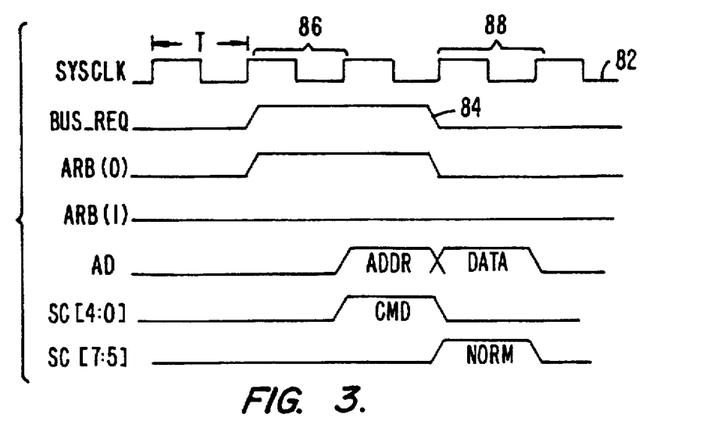
FIGS. 3–7 are time diagrams generally illustrating the protocol used to gain access to the processor system bus of FIG. 1 and to transfer information thereon.

Turning first to FIG. 3, there illustrated is a request for SYSBUS access by the co-processor 16. As illustrated, the co-processor 16 will determine a need for requesting access such as, for example, a transfer (read or write) of a 32-bit data word with the memory system 14. Thus, the co-processor 16 will assert the BUS_REQ signal waveform 84 at the start of the bus cycle 86 and, at the same time, assert its arbitration signal, ARB(0). Assuming, at this time, the MDP 18 has no need for access to the SYSBUS 11, its corresponding ARB(1) signal carried by signal line 42 remains un-asserted.

Since the co-processor 16 is the only Requester data handling unit seeking access to the SYSBUS 11, its associated arbitration logic 70 determines that the SYSBUS is available, communicating a clear (CLR) signal to the microprocessor 62 (FIG. 2) indicative of a grant for information transfer on the SYSBUS. Thus, immediately following the bus cycle 86 the co-processor 16 will place a command (CMD) on the control lines 36 indicative of the type of information transfer desired, together with an address (ADDR) on the AD lines 30 identifying the location of the transfer, which will implicitly identify the Responder. Each responder is assigned a predetermined segment of the memory space capable of being identified by addresses carried on the AD signal lines 30.

Based upon the information received (i.e., the address and command), the Responder unit implicitly identified by the address will execute the requested operation by placing data on (or reading data from) the AD signal lines 30 in one or more bus cycles following that in which the command information was asserted. At the same time, the Responder unit will place on the signal control lines 38, a NORM signal, signifying that the information requested was transferred correctly—insofar as the Requester data handling unit is concerned. Assuming the transfer requested was a simple read or write operation, the colloquy ends with the end of bus cycle 88. Note, as FIG. 3 illustrates, that the BUS__REQ and ARB(0) signals were de-asserted at the start of the last bus cycle 88 of the colloquy. The bus cycle following the drop (de-asserting) of BUS__REQ is the arbitration period for any other Requesters that may have lost the arbitration conducted in the bus cycle immediately preceding the bus cycle 86.

Figure 4:
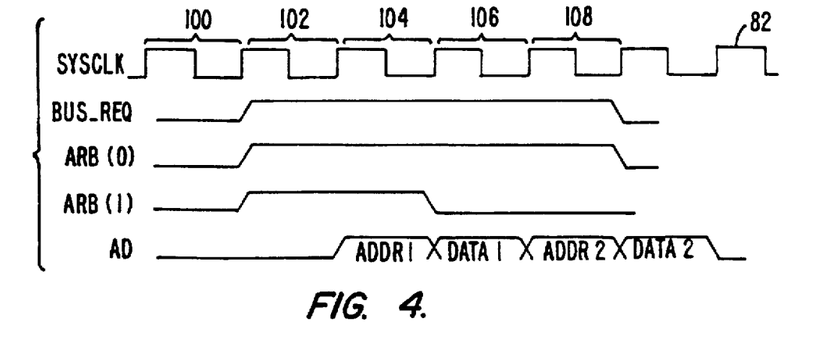

FIG. 4 illustrates the situation in which both the MDP 18 and co-processor 16 seek access to the SYSBUS for information transfers at the same time. During the bus cycle 100 defined by the SYSCLK waveform 82, the processor system 16 and MDP 18 determine a need for an information transfer—say, for example, a data word from the memory system 14. At the next rising edge of SYSCLK, beginning the period or cycle 102, both assert BUS__REQ and their associated arbitration signals, ARB(0) and ARB(1).

Assume that the MDP 18 is of higher priority than the co-processor 16. Accordingly, its arbitration logic (not shown) will unilaterally indicate that it has access; in the same manner, the arbitration logic 70 FIG. 2 of the co-processor 16 will indicate that it (the co-processor 16) must await access. It will continue to assert its ARB (0) signal, as FIG. 4 shows, to indicate its desire to gain access to SYSBUS 11. The MDP 18, now having access to SYSBUS 11, will place on the command lines 36, during bus cycle 104, a command identifying the desired information transfer, together with an address (ADDR1) on the AD lines 30. The next bus cycle 106 the transfer of data (DATA1) occurs on the AD lines 30 from the memory system 16. The transfer, if successful, would be coincidental with assertion of a NORM signal on the system control lines 38 from the Responder (i.e., memory system 14).

At the rising edge of SYSCLK that concludes the bus cycle 104, the MDP 18 will cease driving (asserting) its ARB(1) signal and BUS__REQ signal. However, the BUS__REQ signal remains asserted—by co-processor 16.

The bus cycle 108 immediately following that used to transfer data (DATA1) between the MDP 18 and the designated Responder data handling unit, memory system 14 will see the co-processor 16 assert a command on the system control lines 36, together with an address (ADDR 2) on the AD lines 36 to set up another information transfer between itself and a Responder (e.g., memory system 14). At the conclusion of the bus cycle 108 the co-processor 16 requested data (DATA2) will be transferred, and, assuming only one data word transfer was requested, the BUS__REQ and its associated ARB(0) signals are deasserted. The SYSBUS is now free for access requests.

Figure 5:
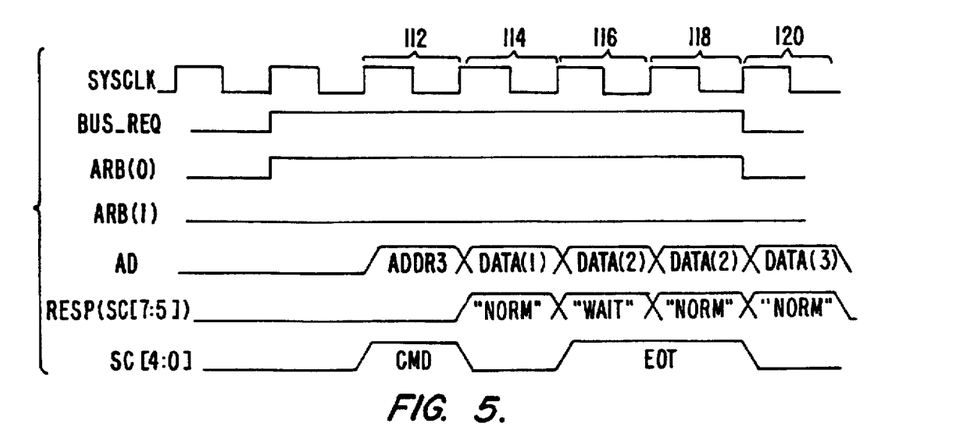

FIG. 5 illustrates the use of the WAIT handshake from a Responder data handling unit, as well as a block transfer and the EOT signal.

Assume that the co-processor 16 desires to write a block of three data words to the memory system 14. As before, access to the SYSBUS is requested by the co-processor 16 by assertion of the BUS__REQ signal together with its associated arbitration signal, ARB(0). The associated arbitration logic 70 of the co-processor 16 signals, via the CLR signal, that access is granted and, therefore, during the bus cycle 112 of SYSCLK the co-processor 16 will assert a "block write" command signal on the signal control lines 36, together with an address (ADDR3) on the AD lines 30, identifying the location in memory system 14 at which the data transfer is to begin. Immediately following the bus cycle 112, the first data word (DATA(1)) is communicated on the AD lines 30 to the memory system 14 which, during this same bus cycle (114) responds with a NORM signal on the system control signal lines 38, signifying that the data word successfully transferred.

Seeing the NORM identifier, the co-processor 16 then places the second data word to be transferred (DATA(2)) on the AD signal lines 30. Since this is the second-to-last data word to be transferred, that fact is signalled to the memory system 14 by assertion, during the same bus cycle 116 that the DATA(2) signals are asserted, of the EOT signal. This time, however, the memory system 14 is unable to accept the DATA(2) data word and issues, on the system control lines 38, the WAIT handshake. The co-processor 16 responds by maintaining the DATA(2) on the AD lines 30 into the next bus cycle 118, and continues to assert the EOT signal on the control lines 36 to indicate that this is still the second-to-last data word.

The memory system 14 signals that it can, and does, receive the DATA(2) by asserting the NORM handshake on the system control lines 36 during the bus cycle 118.

The MDP 18 then drops the EOT signal at the start of the bus cycle 120, and places the third and last data word, DATA(3), on the AD lines 30. The DATA(3) is signalled as being received by the memory system 14 with the NORM handshake, and the transfer cycle is concluded.

Figure 6:
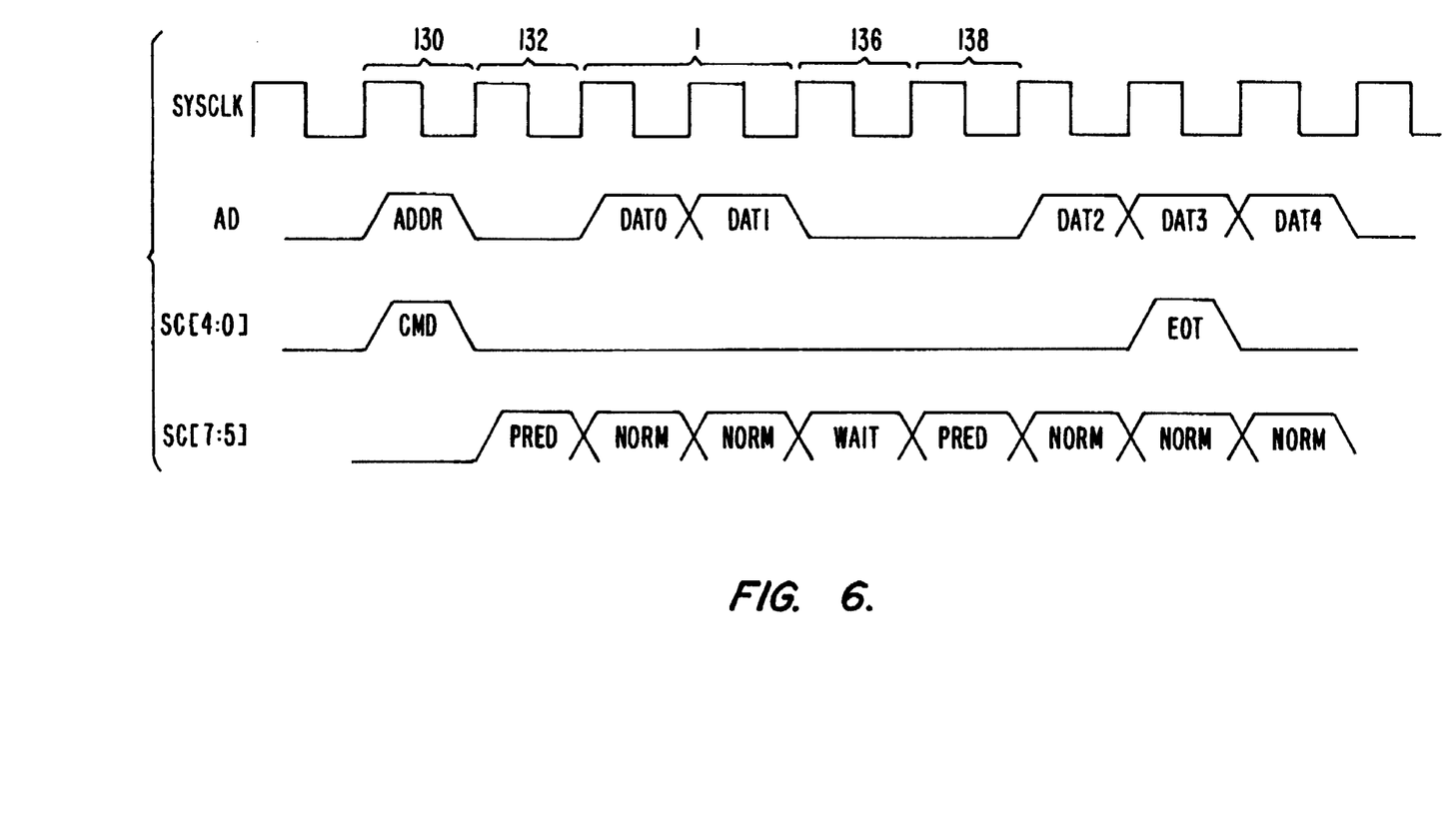

Turning now to FIG. 6, there is illustrated use of the data predict handshake. Assume a Requester data handling unit (e.g., MDP 18 or processor 12) has gained access to the SYSBUS for a block read operation. Accordingly, during the bus cycle 130 of SYSCLK, the Requester, having asserted its associated arbitration and bus request signals, will place a command (CMD) on the control lines 36, accompanied by an address (ADDR) on the AD lines 30, identifying the memory location at which the block read operation is to start, indirectly, thereby, identifying the Responder unit, e.g., memory system 14. The memory system 14, during bus cycle 132, sets up to transfer the information, signalling that data is not immediately forthcoming but will be forthcoming in the immediately succeeding bus cycle, with the data predict (PRED) handshake on the system control lines 38.

The next succeeding two bus cycles 134 will see the transfer of two data words, DAT(0) and DAT(1) by the memory system 14, each accompanied by the NORM handshake.

The next bus cycle 136 sees the memory system 14 unable to transfer the next data word and, therefore, issues the WAIT handshake (or the Data Predict handshake, depending upon when data will be available) on the system control lines 38, followed by the Data Predict (PRED) handshake during the bus cycle 138. The remaining data words are transferred in immediately successive bus cycles uninterrupted, each with an associated NORM handshake from the memory system 14. The bus cycle for the second-to-last data word transfer concludes with the Requester de-asserting the EOT signal to signify that only one more data word need be transmitted.

Figure 7:
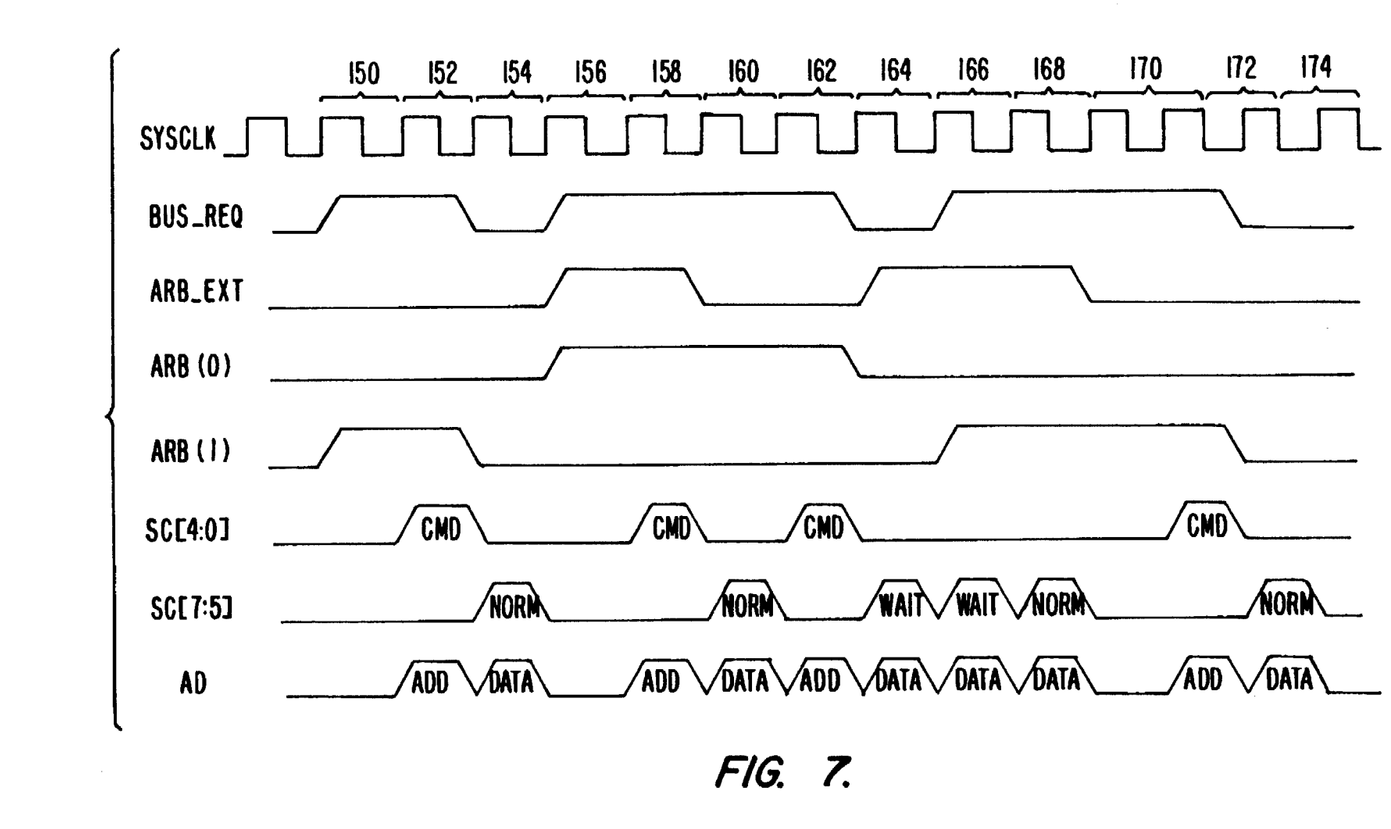

FIG. 7 illustrates several aspects of the arbitration concept, including the request for bus access by the default device, processor 12, through use of the ARB_EXT signal. FIG. 7 also illustrates use of the ARB_EXT signal by a responder unit (memory system 14) to extend information transfers to additional bus cycles.

FIG. 7, therefore, illustrates the MDP 18 obtaining access of the bus by being the highest priority Requester during the bus cycle 150 by assertion of the BUS_REQ signal and its associated arbitration signal, ARB(1). The next bus cycle 152 sees the MDP 18 asserting a command (CMD) on the system control lines 36, together with an address (ADDR) communicated on the AD lines 30. The following bus cycle 154 sees the data being transferred on the AD lines 30, and the responding device asserting the NORM handshake on the system control lines 36.

Assume, during one of the bus cycles 150, 152, that the co-processor 16 decides to request access to the SYSBUS, as does the default device, processor 12. However, since the BUS_REQ signal is asserted during these bus cycles, according to the rules of the access protocol, no other device can request the bus (i.e., they cannot assert BUS_REQ). Since the information transfer exercised by the MDP 18 involved only one data word, and therefore two bus cycles (152, 154), the MDP 18 will drop BUS_REQ, and its associated arbitration signal ARB(1) at the start of the bus cycle 154 (during which the last data word is transferred). Thus, the rising edge of SYSCLKs for the bus cycle 156 sees again the assertion of BUS_REQ, both by the co-processor 16 and processor 12, together with the arbitration signal of co-processor 16, ARB(0), and the ARB_EXT, asserted by the processor 12.

Assertion of the ARB_EXT causes the co-processor 16 to accede bus access to the processor 12 (as determined by the arbitration logic 70 of the co-processor 16 (FIG. 2)), and accordingly co-processor 12 will, in the immediately following bus cycle 158, place a command (CMD) on the system control lines 36, and an address (ADDR) on the AD lines 30 (FIG. 1.). The next bus cycle, 160, sees a transfer of data on the AD lines 130, together with the NORM handshake on the system control lines 38 from the responder data handling device, the memory system 14. At the end of the bus cycle 158 the processor 12 will drop the ARB_EXT signal and its assertion of BUS_REQ. However, the co-processor 16 continues to assert BUS_REQ so that the signal remains asserted on the signal line 32 during the bus cycle 160.

Assume that during the bus cycle 158 the MDP 18 determines that access to the SYSBUS is again needed. However, in light of the fact that BUS_REQ remains asserted, by the co-processor 16 during the bus cycle 158, and by the co-processor 16 during the bus cycles 160 and 162, the MDP 18 must wait until BUS_REQ drops before it can make the request.

The co-processor 16, now having obtained access to the bus during the bus cycle 162, asserts the command identifying the desired operation on the system control lines 38, places the address on the AD lines 30, and cooperates in the transfer of the data that is communicated on the AD lines 30 during the succeeding bus cycle, 164.

Bus cycle 164 sees the co-processor 16 dropping BUS_REQ. Thus, the MDP 18 can now arbitrate for the bus and obtain access. Unfortunately, the Responder unit requested by the co-processor 16 at the start of bus cycle 164, determines that it must extend the bus cycle, and does so by raising the ARB_EXT signal, extending the data transfer through and including bus cycle 168, which concludes with the ARB_EXT signal dropping. This allows the MDP 18 to gain access to the bus, which it does during the bus cycle 172, placing the command (CMD) and address (ADDR) identifiers on their respective signal lines. The bus cycle 172 is followed by bus cycle 174 which sees the data transfer.

In the foregoing discussion of FIG. 7, the Responder unit requested by the co-processor 16, supplied WAIT handshakes for the first two bus cycles following the command phase (bus cycle 162), until it was finally able to transfer the requested data word in bus cycle 168, accompanied by a NORM handshake. Further, the Responder unit was shown as dropping the ARB.EXT signal at the end of the bus cycle 168, permitting the MDP 18 to arbitrate for the SYSBUS 11 during bus cycle 170. However, this causes an idle bus cycle during which nothing is communicated on the AD lines 30. Preferably, therefore, the Requester unit would be configured to drop ARB.EXT at the start of the bus cycle 168, when it knows the data will be transferred. This would permit the arbitration for access to the SYSBUS 11 to occur during the bus cycle 168, which data is transferred on the AD lines 30. The, arbitration having been complete at the beginning of the bus cycle 170, the MDP 18 would communicate the command (CMD) and address (ADDR) information in the bus cycle 170 immediately following that during which the last transfer occurred—deleting the idle bus cycle. This is a much more efficient use of the SYSBUS 11, permitted by the protocol of the present invention.

What is claimed is:

1. In a data processing system having a plurality of data handling units interconnected by a bus for communicating information therebetween, a method for sequentially granting access to the bus for transferring information thereon to each of two or more of the plurality of data handling units, the method comprising the steps of:

the two or more of the plurality of data handling units requesting access to the bus during a bus cycle by each asserting a bus request signal indicative of a request for information transfer on the bus, together with a separate arbitration signal uniquely identifying each of the two or more of the plurality of data handling units;

each of the two or more of the plurality of data handling units receiving the arbitration signals of the other of the two or more of the plurality of data handling units to determine therefrom, on a predetermined priority basis, whether the requested access is granted;

each of the two or more of the plurality of data handling units continuing to assert the bus request signal to preclude the other of the plurality of data handling units from asserting the bus request signal during the information transfer by the two or more of the plurality of data handling units and de-asserting the bus request signal before the information transfer on the bus has been completed.

2. The method of claim 1, wherein the bus request signal is communicated by a signal line shared by the data handling units.

3. The method of claim 1, the plurality of data handling units including a low priority data handling unit coupled to receive the arbitration signals of the other of the plurality of data handling units, the low priority data handling unit being operable to request access to the bus means solely by asserting the bus request signal.

4. The method of claim 1, including a default unit coupled to the plurality of data handling units by an extend signal line, the default unit issuing an arbitration extend signal on the extend signal line to request access to the bus means only when the bus request signal is not asserted by the plurality of data handling units.

5. A data processing system, including a plurality of data handling devices interconnected by a bus for transferring information therebetween in a form of multi-bit data words, the plurality of data handling devices being operable to request information transfers on the bus by asserting a bus request signal, together with an arbitration signal that uniquely identifies the data handling device, a method for arbitrating access to the bus means for a requested information transfer, comprising the steps providing a signal line for communicating the bus request signal to the plurality of data handling devices;

providing, for each of the data handling devices, an arbitration signal line for communicating the arbitration signal between the plurality of the data handling devices;

first ones of the data handling devices asserting the bus request signal to request an information transfer on the bus together with corresponding arbitration signals identifying each of the first ones of the data handling devices;

each of the first ones of the data handling devices determining access to the bus means on an arbitrated basis according to the arbitration signals asserted;

each of the first ones of the data handling devices continuing to assert the bus request signal during the information transfer on the bus means by such first ones of the data handling devices;

preventing assertion of the bus request signal by other of the data handling devices while any of the first ones of the data handling devices continue to assert the bus request signal; and each of the first ones of the data handling devices de-asserting the bus request signal before the information transfer on the bus means has been completed.

6. Apparatus for arbitrating access to a bus of a processing system having a plurality of data handling units intercoupled by the bus for transferring information therebetween, each of the data handling units comprising:

first circuit means for asserting a bus request signal when access to the bus is desired, and for continuing to assert the bus request signal until a requested information transfer is substantially completed by such data handling unit;

second circuit means for asserting an arbitration signal uniquely identifying the data handling unit asserting the bus request unit;

third circuit means coupled to receive the bus request signal and the arbitration signals from other of the plurality of data handling units for determining grant of access to the bus for information transfer;

fourth circuit means for de-asserting the bus request signal during transfer of information on the bus; and means operable to inhibit assertion of the bus request signal when the bus request signal is asserted by other of the plurality of data handling units.

7. The Apparatus of claim 6, including a default data handling unit coupled to the bus means and connected to receive the bus request signal, a signal line coupled between the default device and the plurality of data handling units, the default data handling unit including means for asserting an arbitration signal, when the bus request signal is not asserted, to cause the requester data handling units to permit the default data handling unit access to the bus means for information transfer.

8. The apparatus of claim 7, wherein the default data handling unit includes means for de-asserting the arbitration signal during transfer of information on the bus means by the default data handling unit.

9. The apparatus of claim 8, including a number of responder data handling units coupled to the bus means for transferring information on the bus means when requested by the one of the plurality of data handling units or the default data handling unit.

10. The apparatus of claim 9, at least one of the responder data handling units including means for asserting an extend signal for receipt by the one of the plurality of data handling units during an information transfer between the one of the responder data handling unit and the one of the plurality of data handling units to identify an extension of the information transfer.

11. A method for providing ordered access to a bus interconnecting a plurality of data handling units to communicate information thereon, the plurality of data handling units being coupled to one another by a shared bus request signal line and a number of arbitration lines, the method comprising the steps of:

providing a periodic clock signal having a clock period defining individual bus cycles during which information portions are transferred on the bus by a requesting data handling unit having access to the bus;

each of the ones of data handling units:

requesting access to the bus by asserting a bus request signal on the bus request signal line only when the bus request signal is not already asserted during a first bus cycle, together with an arbitration signal identifying the requesting one data handling unit, and continuing to assert the bus request;

arbitrating between any arbitration signals to determine if access to the bus is available;

transmitting a command, including identification of another one of the plurality of the data handling units as a responding data handling unit during a second bus cycle for which access to the bus is granted;

transferring information on the bus; and de-asserting the bus request signal at approximately at least one bus cycle before the information transfer is complete.

\* \* \* \* \*